UNITED STATES PATENT OFFICE.

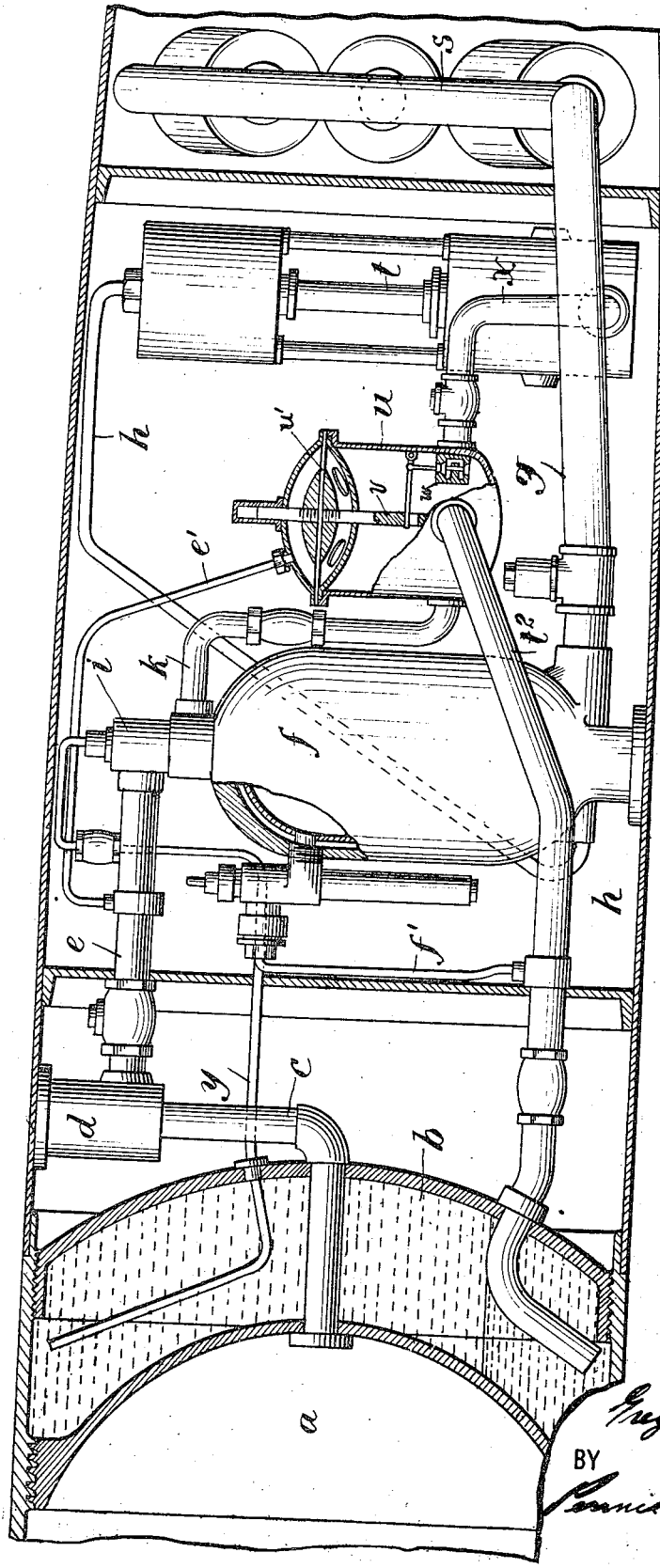

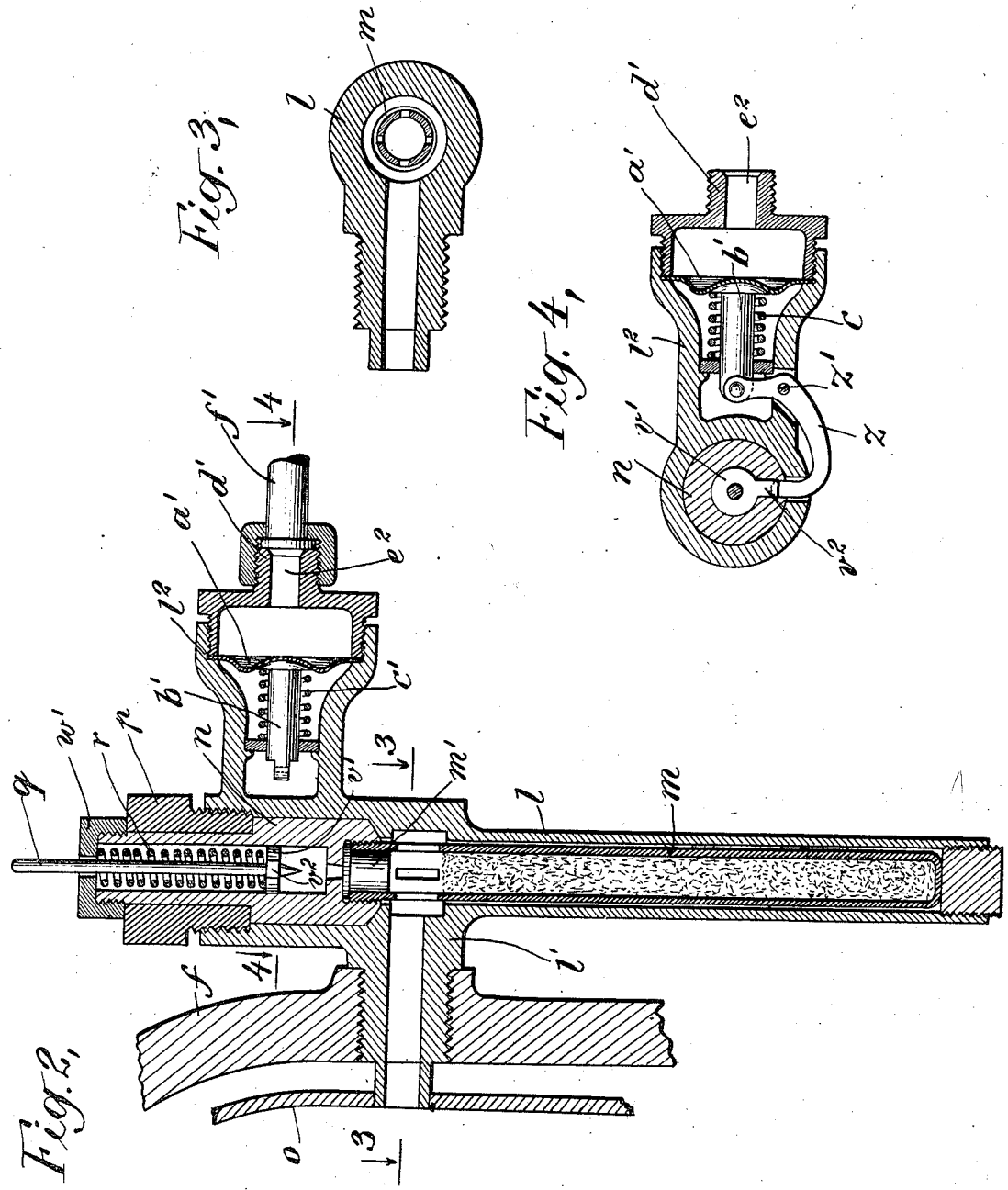

GREGORY CALDWELL DAVISON, OF QUINCY, MASSACHUSETTS, ASSIGNOR TO ELECTRIC BOAT COMPANY, OF NEW YORK, N. Y., A CORPORATION OF NEW JERSEY.

MOTIVE-FLUID-GENERATING APPARATUS FOR AUTOMOBILE TORPEDOES.

1,036,081.  Specification of Letters Patent.  Patented Aug. 20, 1912.

Application filed November 4, 1910. Serial No. 590,627.

*To all whom it may concern:*

Be it known that I, GREGORY C. DAVISON, a citizen of the United States, residing at Quincy, county of Norfolk, Commonwealth of Massachusetts, have invented certain new and useful Improvements in Motive-Fluid-Generating Apparatus for Automobile Torpedoes; and I do hereby declare the following to be a full, clear, and exact description of the invention, such as will enable others skilled in the art to which it appertains to make and use the same.

The invention relates particularly to an improvement upon the system of generating motive fluid for automobile torpedoes described and claimed in my co-pending application for United States Letters Patent, Serial No. 486,455, filed March 29th, 1909.

The primary object of the invention is to further increase the efficiency of such a system, and to further insure that it shall be in operative condition whenever it may be called upon to do its work; though the improved ignition device of the present invention is in itself applicable to other systems, as will appear.

The particular nature of the improvements will be understood from the following description and the accompanying drawings.

In the drawings, Figure 1 is a central vertical section of a portion of a torpedo, showing the apparatus of my invention, partly in section and partly in elevation; Fig. 2 is a vertical section of the improved ignition mechanism constructed in accordance with the invention; Fig. 3, is a sectional plan on the line 3—3 of Fig. 2; and Fig. 4, is a sectional plan on the line 4—4 of Fig. 2.

The motive fluid is produced by burning a mixture of fuel and an oxygen-carrier, and mixing with the products of combustion a quantity of water vapor, whereby there is produced a motive fluid under extremely high pressure and at moderate temperature, which is admirably adapted to the operation of the light, high-speed, powerful engines which are used on such torpedoes; and a very high degree of efficiency of the energy transformation is secured. The oxygen-carrier, preferably air or oxygen under pressure, is contained in a tank $a$ which, in the construction illustrated, is formed by partitioning off a portion of the body of the torpedo in the customary way; and the fuel is contained in a tank $b$ which is likewise formed by partitioning off a portion of the body of the torpedo. A take-off pipe $c$ leads from the tank $a$ to and through a combined starting and reducing valve $d$ which is of the type customarily used in torpedoes of this class, and is adapted to be opened automatically when the torpedo is launched. From here the oxygen-carrier flows at a reduced pressure through the pipe $e$ to the generator $f$, within which it is intended that the mixed fuel and oxygen-carrier shall be burned and charged with water vapor. The type of generator illustrated is that disclosed in my earlier application, but for the purposes of the present description it is sufficient to say that it is a generator in which the mixed fuel and oxygen-carrier burn and and water vapor is mixed with the products of combustion. From the lower portion of the generator, a take-off pipe $g$ leads to the engine $s$, and a smaller take-off pipe $h$ leads to the pump $t$. Tapped into the upper end of the generator is a compound nozzle $i$, to which the oxygen-carrier, the fuel, and the water are supplied, and through which they are fed into the generator. The oxygen-carrier passes to the compound nozzle through the pipe $e$, the fuel through the pipe $y$, and the water through the pipe $k$. The pump $t$ draws water from the seat and supplies it to the generator and to the fuel tank through the intermediate regulator $u$. The construction of this regulator will be understood from Fig. 1, from which it will be seen that it comprises a casing divided into an upper and lower chamber by a flexible diaphragm $u'$, which diaphragm carries an adjustable slotted stem $v$, actuating the double-seated balance valve $w$, which controls the inlet passage from the pipe $x$, leading from the delivery side of the pump. Into the lower portion of the lower chamber of the regulator is also tapped the outlet pipe $t^2$, leading to the lower part of the fuel tank $b$, and the outlet pipe $k$, leading to the compound nozzle. Into the upper part of the regulator, above the flexible diaphragm, is tapped the pipe $e'$, branching from the pipe $e$ and containing the oxygen-carrier under pressure.

The parts above described are all constructed in accordance with my earlier application before referred to. In that case, however, ignition was brought about by an ignition device responsive to the pressure within the generating chamber, the said ignition device comprising a tubular casing communicating with the generating chamber and containing a fuse arranged to slide in the casing and normally resting at the lower end thereof, so that as soon as the pressure within the chamber was sufficient to lift the fuse, it would be forced against the stationary firing projection. Such ignition devices are well known in the art and have the defect that the time of ignition cannot be adjusted, and the ignition device may be fired and the fuse burned by the pressure of the air in the generating chamber before the flow of fuel begins, in which event ignition will not occur. It is highly desirable to provide an ignition device such that the precise instant at which the igniter is fired may be regulated, and further, to make the operation of firing dependent upon the pressure of the fuel, so that the fuse will not be ignited until the fuel is freely flowing into the generating chamber. It is further advantageous to make the firing operation ultimately dependent, as are all the other operations of the system, upon the pressure of the oxygen-carrier, so that the entire steam generating apparatus constitutes an inter-dependent system, and the various operations are performed in their proper sequence, to thus secure reliability and safety. To this end, I provide the improved ignition mechanism illustrated in the drawings. This ignition mechanism comprises a casing $l$, having a lateral extension $l'$, screwed into the wall of the generating chamber $f$, and, if the dome-shaped hood of my earlier application is employed, projecting through said hood, the extension containing an open duct through which communication is established between the interior of the casing $l$ and the combustible mixture in the generating chamber. This casing $l$ constitutes a receptacle for the fuse case $m$, which is screwed into the plug $n$, fitting in the enlarged upper end of the casing $l$, and adapted to be forced onto the seat at the lower end of the enlarged portion by means of the surrounding screw follower nut $p$. The plug $n$ constitutes a guide sleeve for the firing pin $q$, which is urged to the firing position by the coiled spring $r$, confined between the trigger disk $v$, and the screw cap $w'$, which screws onto the upper end of the plug $n$. The trigger disk $v$ has a projection $v^2$, extending into a slot in the side of plug $n$, and engaging the trigger $z$ pivoted at $z'$ in the wall of the laterally extending chamber $l^2$, which extends from the fuse receptacle $l$. This chamber contains a flexible diaphragm $a'$, seated on a shoulder in the casing $l^2$, and carrying a plunger $b'$, to which the end of the trigger $z$ is connected, the spring $c'$ being provided to force the diaphragm outwardly. The diaphragm is held in position by the screw $d'$, which has a pressure-admission orifice $e^2$, connected by the pressure pipe $f'$ to a part of the pressure system which supplies the fuel.

The parts are prepared for the firing operation in the following manner: The fuse case $m$, being provided with a blank cartridge $m'$ at its upper end, is screwed into the plug $n$. The plug is then inserted in the casing $l$, and turned until the trigger $z$ is projected into the slot, whereupon the follower nut $p$ is screwed down. This forces the plug against its seat and at the same time cocks the firing pin, the firing spring $r$, being then inserted and the cap $w'$ screwed into place. The parts are then ready for firing by the pressure of the fuel acting against the diaphragm $a'$.

The sequence of operations of the whole system is as follows: When the torpedo is launched, air at the pressure for which the pressure reducing valve $d$ is set, passes into the generator and on to the pump, thereby starting the pump to feed the water. The air pressure is also communicated to the diaphragm $u'$ of the regulator, in such a way as to make the pressure of the water, and consequently of the fuel, the same as the pressure of the oxygen-carrier. The water and fuel are fed under this pressure to the generator, and by suitably dimensioning the orifices of the water and fuel feed pipes, the rate of flow is made to bear a fixed proportion to the rate of flow of air. The spring $c'$ is set for a given pressure, which may be adjusted by changing that spring, so that when the flow of fluids has commenced, the water pressure, which in this case is equal to the fuel pressure, acts upon the diaphragm $a'$ and releases the firing pin $q$, which explodes the cartridge and ignites the fuse, and the burning fuse in turn ignites the combustible mixture within the generating chamber.

It will, of course, be understood that by reduction orifices in the feed pipes, or by reducing the dimensions of those pipes, and by reason of the large volume of the generating chamber and the outlet pipe therefrom to the engines, there will exist a difference of pressure between the combustion space of the generator and the system of pipes leading to the nozzles. For example, let it be assumed that the pressure reducing valve $d$ is set for a pressure of 350 pounds. This will then be the pressure which feeds the air, water and fuel to their respective orifices. The pressure inside the generator will, for example, be 325 pounds. The difference in pressure then, which feeds these fluids will be 25 pounds. This difference in pressure is dependent upon the areas of the orifices, or the pipes, and the proportions of the respective fluids will depend upon the relative areas of these orifices or pipes. In the example given, the igniter diaphragm spring $c'$ should be set for a pressure of about 250 pounds.

This system has the advantages set forth in my earlier application referred to, in that no injury can result to a torpedo in case, for example, the pump should be disabled and the water should not be injected into the generator. If the water supply fails, the fuel supply will also fail, and there is no danger of burning out the apparatus. The improved system has the further advantage that ignition is made practically certain because the actuation of the igniter is dependent upon the fuel pressure and, therefore, if for some reason the supply of water, and consequently the supply of fuel is delayed, the firing of the igniter will also be delayed until the fuel and water are fed into the generator. It will further be understood that, though this dependence of the fuel supply on the water supply and their ultimate dependence upon the pressure of the oxygen-carrier is greatly to be desired, yet the improvement of the present invention is applicable to any system in which the flow of either the fuel or the oxygen-carrier is dependent upon the pressure of the other and the actuation of the igniter is in turn dependent upon that element of the combustible mixture which is itself dependent upon the pressure of the other element of the mixture, so that the ignition apparatus cannot operate until the flow of both elements of the mixture has begun.

What I claim is:

1. In apparatus for generating motive fluid for automobile torpedoes, a generating chamber in which an oxygen-carrier and fuel are burned, means for supplying the oxygen-carrier and the fuel under pressure to the generating chamber to form a combustible mixture, the feed of one of the elements of the mixture being dependent upon the pressure of the other, an igniting device, and connections whereby the actuation of the igniting device is dependent upon the pressure of that element which is itself dependent upon the pressure of the other element of the mixture; substantially as described.

2. In apparatus for generating motive fluid for automobile torpedoes, a generating chamber in which an oxygen-carrier and fuel are burned, means for supplying the oxygen-carrier and the fuel under pressure to the generating chamber, an ignition device, and connections whereby the actuation of the ignition device is dependent upon the pressure of the fuel; substantially as described.

3. In apparatus for generating motive fluid for automobile torpedoes, a generating chamber in which an oxygen-carrier and fuel are burned, means for supplying the oxygen-carrier under pressure to the generating chamber, means dependent upon the pressure of the oxygen-carrier for supplying the fuel under pressure to the generating chamber, an ignition device, and connections whereby the actuation of the ignition device is dependent upon the pressure of the fuel; substantially as described.

4. In apparatus for generating motive fluid for automobile torpedoes, a generating chamber in which an oxygen-carrier and fuel are burned and the products of combustion mixed with water vapor, a supply of oxygen-carrier under pressure, a pressure system dependent upon the pressure of the oxygen-carrier for supplying fuel and water to said chamber, an ignition device, and connections whereby the actuation of the ignition device is dependent upon the pressure in said system; substantially as described.

5. In apparatus for generating motive fluid for automobile torpedoes, a generating chamber in which an oxygen-carrier and fuel are burned, a supply of oxygen-carrier under pressure, a pump, and connections whereby the pump may be started by the oxygen-carrier, in combination with a pressure fuel feed system fed from the pump, an ignition device, and connections whereby the actuation of the ignition device is dependent upon the pressure in the fuel-feed system; substantially as described.

6. In apparatus for generating motive fluid for automobile torpedoes, a generating chamber in which an oxygen-carrier and fuel are burned, means for supplying the oxygen-carrier and the fuel under pressure to the generating chamber, an ignition device, and connections whereby the actuation of the ignition device is dependent upon the pressure of the fuel, said connections being adjustable to determine the period of ignition; substantially as described.

7. In apparatus for generating motive fluid for automobile torpedoes, a generating chamber in which an oxygen-carrier and fuel are burned, and means for feeding the oxygen-carrier and fuel to said chamber, in combination with a fuse-receptacle constituting a chamber separate from but communicating with the generating chamber through an open duct, a fuse in said receptacle, and pressure-controlled firing mechanism for the fuse; substantially as described.

8. In apparatus for generating motive fluid for automobile torpedoes, a generating chamber in which an oxygen-carrier and fuel are burned, and means for feeding the oxygen-carrier and fuel to said chamber, in combination with a fuse-receptacle constituting a chamber separate from but communicating with the generating chamber through an open duct, a fuse in said receptacle, firing mechanism for the fuse, and adjustable pressure-actuated means for controlling the firing mechanism; substantially as described.

In testimony whereof I affix my signature, in presence of two witnesses.

GREGORY CALDWELL DAVISON.

Witnesses:
F. L. BRAKE,
J. E. FITZGERALD, Jr.